US010265791B1

(12) United States Patent
Wilson et al.

(10) Patent No.: US 10,265,791 B1
(45) Date of Patent: Apr. 23, 2019

(54) AUTOMATED BRAZING APPARATUS AND METHOD

(71) Applicant: Shoals Tubular Products, Inc., Muscle Shoals, AL (US)

(72) Inventors: Mark J. Wilson, Muscle Shoals, AL (US); Charles Terry Cook, Muscle Shoals, AL (US)

(73) Assignee: Shoals Tubular, Inc., Florence, AL (US)

( * ) Notice: Subject to any disclaimer, the term of this patent is extended or adjusted under 35 U.S.C. 154(b) by 110 days.

(21) Appl. No.: 15/265,588

(22) Filed: Sep. 14, 2016

Related U.S. Application Data

(60) Provisional application No. 62/218,185, filed on Sep. 14, 2015.

(51) Int. Cl.
*B23K 3/00* (2006.01)
*B23K 37/00* (2006.01)
(Continued)

(52) U.S. Cl.
CPC ............ *B23K 1/0008* (2013.01); *B23K 3/085* (2013.01); *B23K 3/087* (2013.01);
(Continued)

(58) Field of Classification Search
None
See application file for complete search history.

(56) References Cited

U.S. PATENT DOCUMENTS 2,697,774 A * 12/1954 Adler .................. H01H 11/041
219/158
2,818,494 A  12/1957 Bernard et al.
(Continued)

FOREIGN PATENT DOCUMENTS

| CN | 102350556 | 2/2012 |
| GB | 1389967 | 4/1975 |
| JP | 57085690 | 5/1982 |

OTHER PUBLICATIONS

Huissoon; Robotic laser welding: seam sensor and laser focal frame registration; Nov. 12, 2001; Retrieved from: http://journals.cambridge.org/action/displayAbstract?fromPage=online&aid=104683&field=S0263574701003988.

*Primary Examiner* — Devang R Patel
(74) *Attorney, Agent, or Firm* — Angela Holt; Bradley Arant Boult Cummings LLP

(57) ABSTRACT

A system for automatically brazing joints in a manifold has a loading station, a brazing station, and a cooling station. The brazing station has a plurality of brazing torches moveable to a joint in the manifold to braze the joint. First, second and third fixture frames extend from a common rotatable platform. The platform rotates each of the fixture frames to each of the loading station, brazing station, and cooling station in turn. The fixture frames support manifolds with joints requiring brazing. The torches are disposed on a lifting platform that lifts the torches up to a desired joint. The lifting platform is disposed on a sliding platform that slides the torches horizontally to the desired joint. The torches surround the joint and braze it from all sides simultaneously. While brazing is being performed at the brazing station, loading and unloading of manifolds may be done at the loading station, and cooling of already-brazed manifolds may take place at the cooling station.

7 Claims, 5 Drawing Sheets

(51) Int. Cl.
  *B23K 1/00* (2006.01)
  *B23K 3/08* (2006.01)
  *B23K 37/02* (2006.01)
  *B23K 101/06* (2006.01)
  *B23K 103/10* (2006.01)

(52) U.S. Cl.
  CPC ...... *B23K 37/0229* (2013.01); *B23K 2101/06* (2018.08); *B23K 2103/10* (2018.08)

(56) References Cited

U.S. PATENT DOCUMENTS

| | | | |
|---|---|---|---|
| 2,961,985 A | 11/1960 | O'Harah | |
| 3,239,209 A | 3/1966 | Kucka | |
| 3,541,292 A * | 11/1970 | Hanback | B23K 3/087 219/158 |
| 3,566,070 A | 2/1971 | Plegat | |
| 3,991,927 A | 11/1976 | Napor et al. | |
| 4,145,593 A | 3/1979 | Merrick et al. | |
| 4,163,886 A | 8/1979 | Omae et al. | |
| 4,480,165 A * | 10/1984 | Haushalter | B23K 1/0012 219/158 |
| 4,863,092 A | 9/1989 | Nguyen | |
| 5,075,527 A | 12/1991 | Ikuma | |
| 5,125,555 A * | 6/1992 | Grisoni | B23K 5/00 228/45 |
| 5,932,123 A | 8/1999 | Marhofer et al. | |
| 6,871,771 B2 | 3/2005 | Tonjes et al. | |
| 6,907,318 B2 * | 6/2005 | Passmore | B23K 9/287 219/110 |
| 7,000,820 B2 * | 2/2006 | Haffner | B23K 1/0012 165/153 |
| 7,745,761 B2 | 6/2010 | Chen et al. | |
| 2007/0297566 A1 | 12/2007 | Spencer et al. | |
| 2013/0048619 A1 * | 2/2013 | Doyle | B23K 9/0956 219/122 |

* cited by examiner

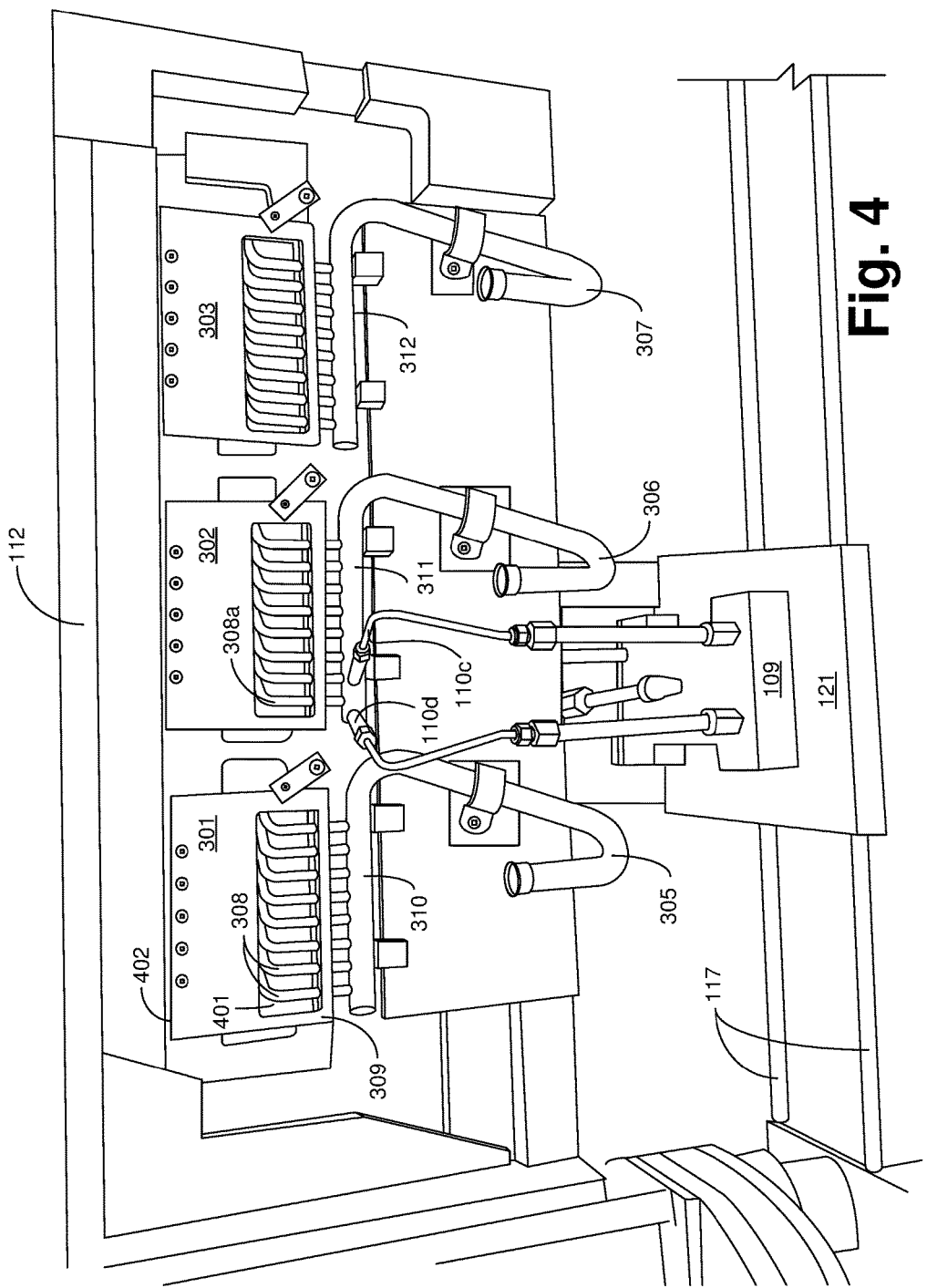

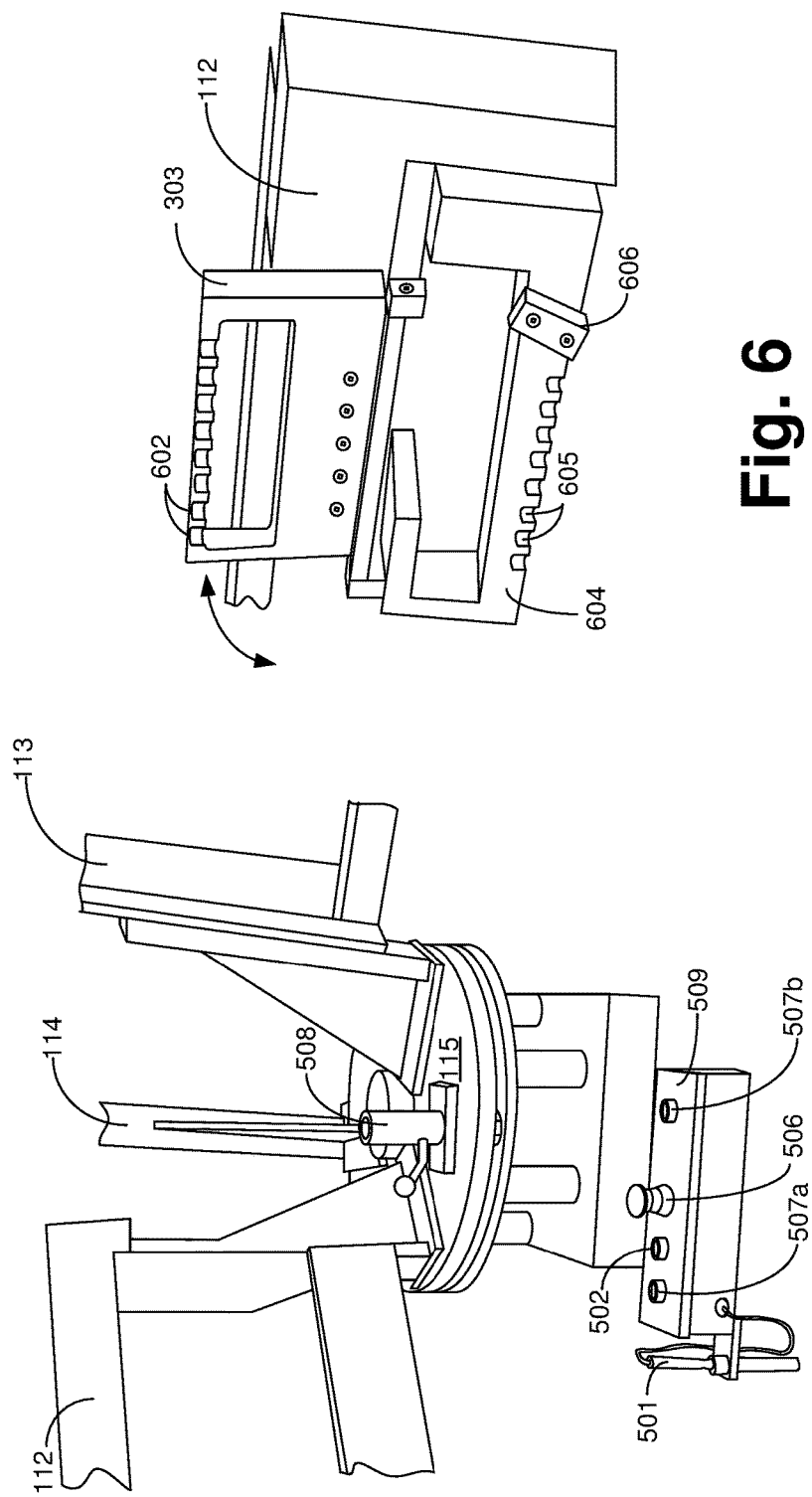

AUTOMATED BRAZING APPARATUS AND METHOD

REFERENCE TO RELATED APPLICATIONS

This application claims priority to Provisional Patent Application U.S. Ser. No. 62/218,185, entitled "Automated Brazing Apparatus and Method" and filed on Sep. 14, 2015, which is fully incorporated herein by reference.

BACKGROUND AND SUMMARY OF THE INVENTION

Traditionally, brazing of aluminum tubes in manifolds has been done by hand-brazing, a labor-intensive and expensive operation. An apparatus and method according to the present disclosure provides automatic brazing of aluminum tubes. In an exemplary embodiment, the apparatus comprises three fixture frames disposed 120 degrees apart on a rotating platform. The fixture frames hold the manifold tubes in place during brazing. The rotating platform allows a first fixture frame to be in a brazing position, a second fixture frame to be in a cooling position, and a third fixture frame to be in a load/unload position. While a fixture frame is in the brazing position, automatically-controlled brazing torches move to the desired joints and perform the brazing operation.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

FIG. 4 is an enlarged view of the fixture frame of FIG. 3.

FIG. 5 is an enlarged view of the rotating platform showing the operator panel.

FIG. 6 is a perspective view of an exemplary fixture frame and flip gate.

DETAILED DESCRIPTION

Figure 1:
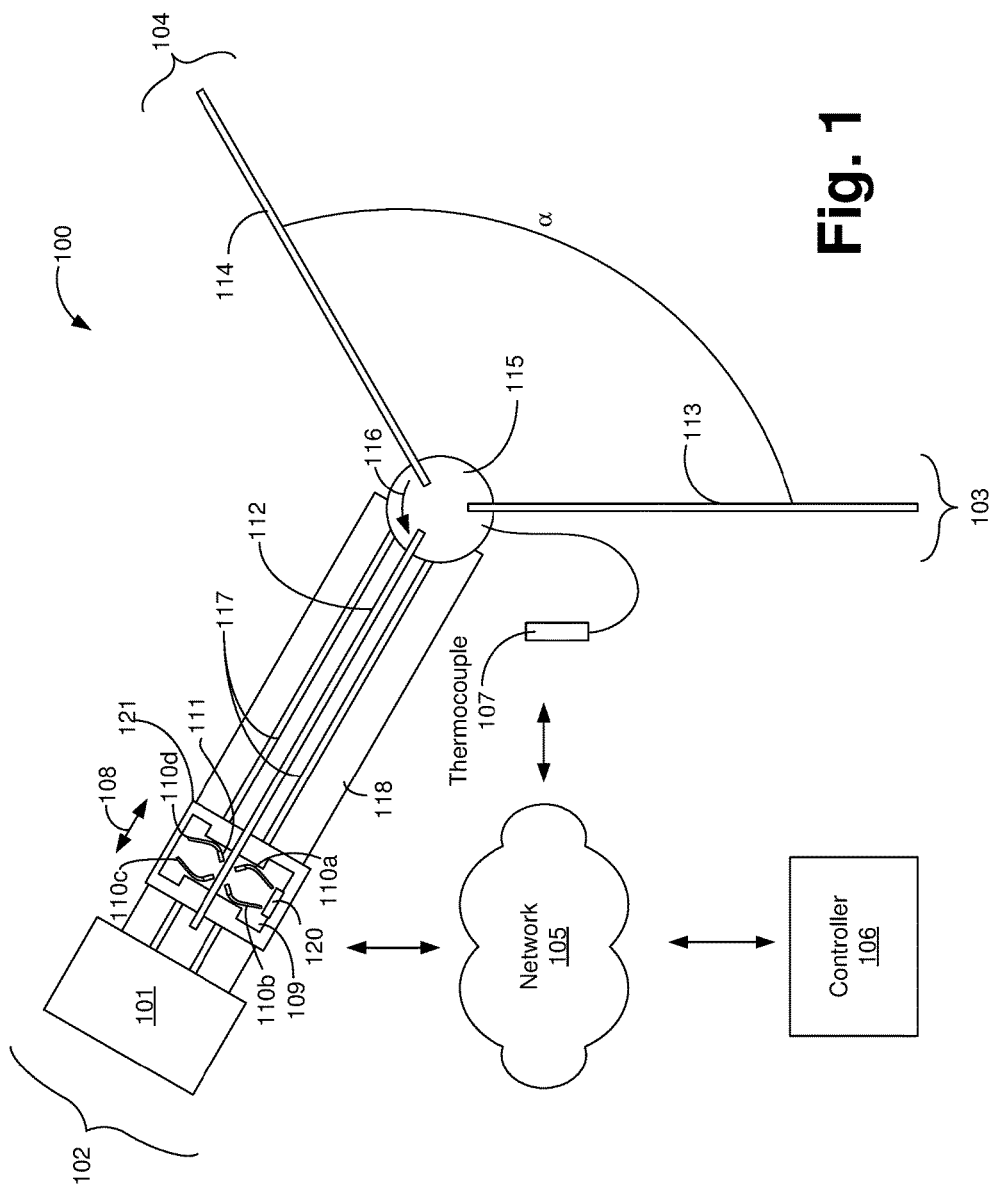
FIG. 1 is a functional representation of an automatic brazing system in accordance with an exemplary embodiment of the present disclosure.

FIG. 1 depicts an automated brazing system 100 according to an embodiment of the present disclosure. The system 100 comprises a brazing station 102, a cooling station 103, and a loading station 104. The system 100 further comprises a first fixture frame 112, a second fixture frame 113 and a third fixture frame 114. The fixture frames 112-114 are affixed to a rotatable central platform 115. Each of the fixture frames 112-114 extends radially from the platform. In the illustrated embodiment, each of the fixture frames 112-114 is separated from the adjacent fixture frame by an angle α, which is 120 degrees in the illustrated embodiment. The platform 115 rotates in the direction indicated by directional arrow 116 (i.e., counterclockwise) in the illustrated embodiment.

At the loading station 104, parts (not shown) in need of brazing are loaded into the fixture frame 114. At the brazing station 102, the parts that have been previously loaded into the fixture frame 112 are brazed, as further discussed herein. At the cooling station 103, the parts that have been previously loaded into the fixture frame 113 and brazed are allowed to cool. This arrangement allows for all three processes—loading, brazing and cooling—to take place at the same time.

The system 100 according to the illustrated embodiment comprises three stations 102-104, and three corresponding fixture frames 112-114. Other embodiments may have more or fewer stations and fixture frames.

The brazing station 102 comprises a lifting platform 109 and a plurality of brazing torches 110a-110d disposed on the lifting platform 109. Each of the plurality of brazing torches 110a-110d comprises a torch head 111. The torch heads 111 of each of the brazing torches 110a-110d are generally disposed ninety (90) degrees apart, spaced apart from one another. This arrangement allows the brazing torches to be equidistant from each other, and to surround a joint for brazing on four sides, as further discussed herein.

Torches 110a and 110b are configured to braze a joint (not shown) from one side of the fixture frame 112, and torches 110c and 110d are configured to braze from an opposite side of the fixture frame. The lifting platform 109 thus extends on both sides of the fixture frame 112.

The lifting platform 109 is disposed on a sliding platform 121. The sliding platform 121 moves along tracks 117 disposed on a track support stand 118 and positions the torches 110a-110d in horizontal alignment with the part in need of brazing. The tracks 117 engage with the sliding platform 121 to move the sliding platform 121 in the direction indicated by directional arrow 108, i.e., radially inwardly and outwardly along the fixture frame 112. This direction is referred to as the "x" axis herein. The lifting platform 109 moves up and down vertically (in a "z" direction), as further discussed herein.

In the illustrated embodiment, when the brazing torches 110a-110d are not in use, the brazing torches 110a-110d are "parked" in a barn 101. The barn 101 is a double-walled metal box (with insulation between the walls) that partially encloses the torches 110a-110d. The torches go into a "low" mode when they are parked in the barn 101.

The lifting platform 109 further comprises a pyrometer 120 that measures the torch temperature. In one embodiment, the pyrometer 120 is an infrared pyrometer that measures the temperature of the joints undergoing brazing. The pyrometer 120 focuses on the joint being brazed (not shown) and sends the joint temperature back to the controller 106. If the maximum allowable temperature that the joint should experience is neared, the controller shortens the brazing time to prevent the joint from overheating.

When the system 100 is in the orientation shown in FIG. 1, the fixture frame 112 is in a brazing position, the fixture frame 114 is in a loading/unloading position, and the fixture frame 113 is in a cooling position. During operation of the system 100, the platform 115 rotates each fixture frame through each of the three positions (i.e., brazing, loading/unloading, and cooling).

The system 100 includes thermocouples 107 that are used to measure the temperature of the manifolds before brazing, as further discussed herein. A controller 106 controls movement and positioning of the lifting platform 109, the sliding platform 121, the operation of the brazing torches 110a-110d, and operation of the thermocouples 107. The controller 106 receives temperature data from the pyrometer 120 and adjusts the brazing temperature accordingly. The controller 106 may be any suitable computer known in the art or future-developed.

The controller 106 communicates across a network 105. The network 105 may be of any type network or networks known in the art or future-developed, such as the internet backbone, Ethernet, Wifi, WiMax, coaxial cable, fiber optic cable, and the like. The network 105 may be any combination of hardware, software, or both.

Figure 2:
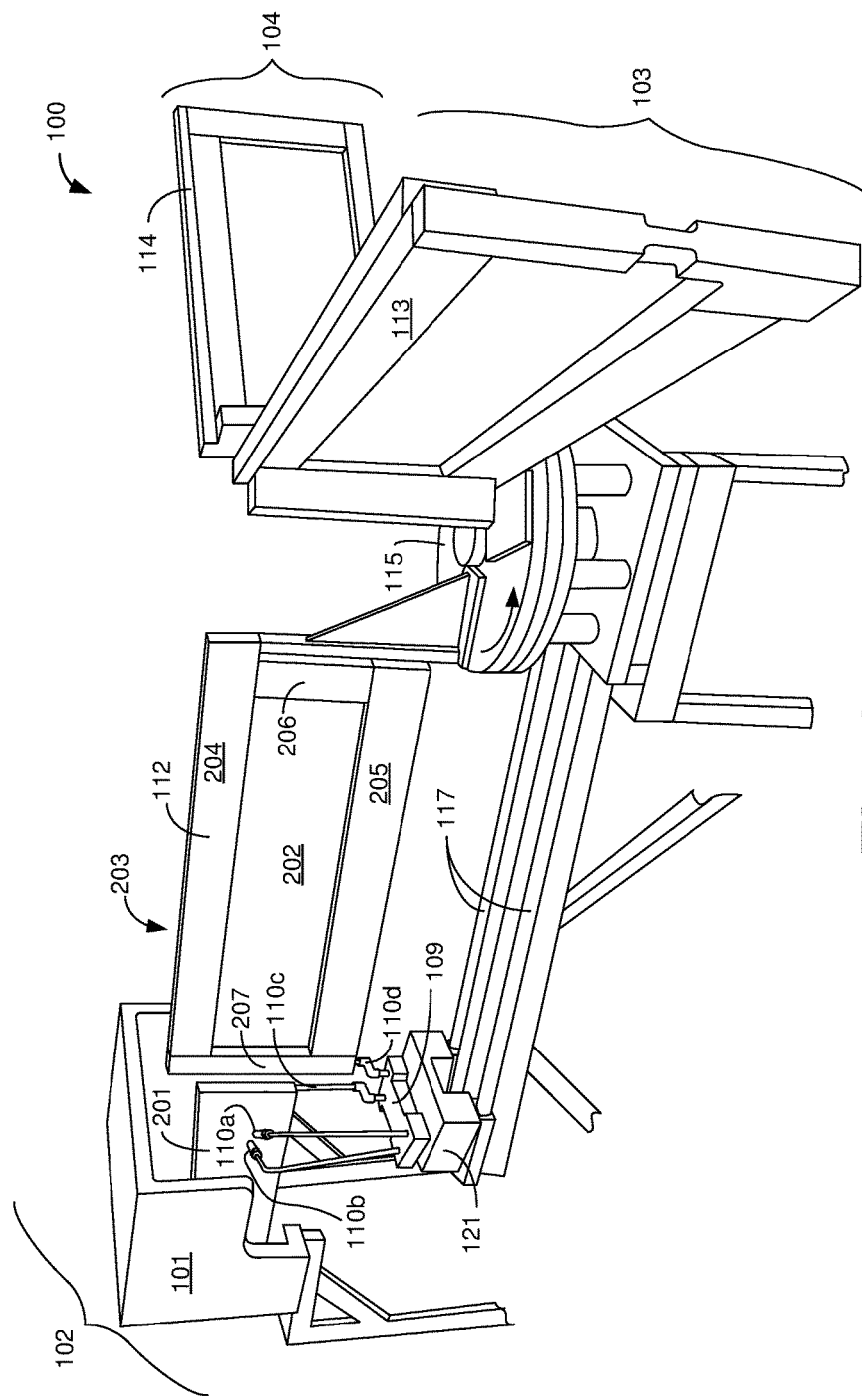
FIG. 2 is a perspective view of an automatic brazing system in accordance with an exemplary embodiment of the present disclosure.

FIG. 2 is a perspective view of one embodiment of the system 100 of FIG. 1. The fixture frames 112, 113 and 114 are depicted in this figure without the manifolds to be brazed installed on the fixture frames. FIG. 4 depicts exemplary manifolds undergoing brazing. The fixture frames 112-114 are affixed to the rotatable central platform 115.

The fixture frame 112 is in the brazing position in the illustrated embodiment. The lifting platform 109 comprises the brazing torches 110a, 110b, 110c and 110d. Torches 110a and 110b are configured to braze from one side of the fixture frame 112, and torches 110c and 110d are configured to braze from the opposite side of the fixture frame. The sliding platform 121 slides along the tracks 117 as further discussed herein.

FIG. 2 depicts the brazing torches 110a-110d parked in the barn 101. In the illustrated embodiment, the barn 101 is a double-walled metal box (with insulation between the walls) that encloses the torches 110a-110d on four sides (top, rear, right side, left side) as shown. The controller 106 (FIG. 1) causes the torches 110a-110d to go into a "low" mode when they are parked in the barn 101. A central plate 201 in the barn is disposed between the torches 110a and 110b and the torches 110c and 110d, as further discussed herein.

The fixture frames 112-114 comprise structural frames 203 with one or more openings 202 disposed within the frames. In this regard, the structural frames 203 generally comprise a radially extending top side 204, a radially-extending bottom side 205, a substantially vertical inner side 206, and a substantially vertical outer side 207. Additional supports may be installed as needed. The fixture frames 112-114 are configurable to support any of a number of manifold configurations for brazing joints, and the frames 112-114 are custom-configured for specific manifolds. Further, the fixture frames 112-114 comprise openings 202 to allow tubes (not shown) to pass through the fixture frames. The number, size and configuration of the openings 202 depend on the configuration of the manifold undergoing brazing operations.

In this position, the brazing torches 110a-110d move to the tubes being brazed (see FIG. 2) and complete the brazing operation. Fixture frame 114 is in the load/unload position. In this position, the parts undergoing brazing can be loaded and unloaded from the fixture frame 114, as further discussed herein. Fixture frame 113 is in the cooling position. In this position, the recently-brazed parts can cool before being loaded and unloaded, as further discussed herein.

Figure 3:
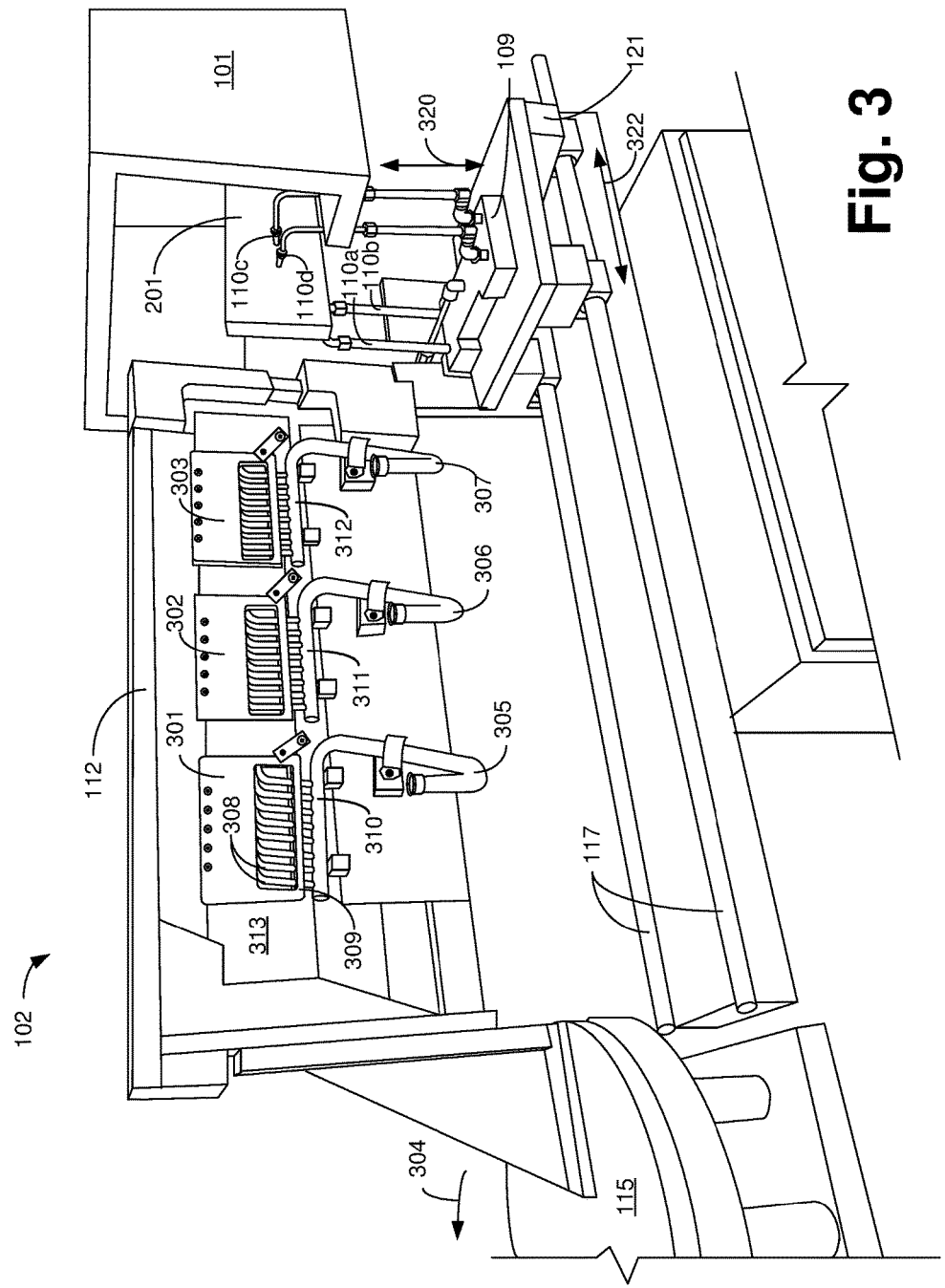
FIG. 3 is a perspective view of a fixture frame in brazing position.

FIG. 3 is an enlarged view of the fixture frame 112 in the brazing station 102.

Three identical manifolds 305, 306, and 307 are loaded in the fixture frame 112 in preparation for brazing. In this figure, each manifold comprises eight (8) smaller aluminum tubes 308 being brazed to a larger aluminum tube 310 (for manifold 305), tube 311 (for manifold 306), or tube 312 (for manifold 307). In this regard, a braze is desired to be performed at the intersection of the smaller tubes 308 to the larger tube 310, for each of the smaller tubes 308. The fixture frame 112 is configured specifically for the manifolds being brazed, and the entire fixture frame 112 can be swapped out with other customized fixture frames to braze other parts/manifolds.

FIG. 3 depicts the front side of the fixture frame 112. Portions of the smaller tubes 308 are bent and extend through openings 313 in the fixture frame 112 for the manifold 305. The fixture frame 112 comprises a flip gate 301 associated with manifold 305. The flip gate 301 comprises aluminum plates that hold the smaller tubes 308 in place during brazing. Indentations (not shown) in a lower edge 309 of the flip gate 301 are semicircular and the tubes 308 fit within and are secured by the indentations. The flip gate 301 is hinged at its top edge and flip upwards to release the manifold 305. A flip gate 302 is substantially similar to the flip gate 301 and is associated with and retains the manifold 306 during brazing. A flip gate 303 is substantially similar to the flip gate 301 and is associated with and retains the manifold 307 during brazing.

The lower edge 309 of the flip gate 301 acts as a heat sink during brazing operations. In this regard, the lower edge 309 contacting the smaller tubes 308 helps dissipate heat from the smaller tubes 308 during brazing. This is important because the smaller tubes 308 are smaller and have thinner walls than the larger tube 310, and are thus more susceptible to overheating and warping during the brazing operation.

The brazing torches 110a-d are shown in FIG. 3 parked in the barn 101. In the barn 101, the ceramic plate 201 between front torches 110c and 110d and rear torches 110a and 110b insulates the front torches 110c and 110d from the rear torches 110a and 110b, and further prevents the torches 110a-110d from doing any damage while parked in the barn 101.

The brazing torches 110a-110d are disposed on the lifting platform 109 that moves in the + or − "z" direction (generally vertically) as indicated by the directional arrow 320 in FIG. 3. The lifting platform 109 is disposed on the sliding platform 121 that moves in the + or − "x" direction as shown in FIG. 3, along generally horizontal tracks 117, as indicated by the directional arrow 322. The sliding platform 121 moves the brazing torches 110a-110d a desired distance in the x direction and the lifting platform 109 moves the brazing torches 110a-110d a desired distance in the z direction, until the brazing torches 110a-110d are proximate to the desired braze location, as further discussed herein. After the brazing operation is complete, the central platform 115 rotates in the direction indicated by directional arrow 304 to move the fixture frame 112 to the cooling station 103 (FIG. 1).

FIG. 4 is an enlarged view of the fixture frame 112 of FIG. 3, with the brazing torches 110a-110d performing a braze on the first smaller tube 308a in the manifold 306. The braze will join the smaller tube 308a with the larger tube 311. The controller 106 (FIG. 1) can be programmed to perform the brazes in any desired order. For example, the brazing torches 110a-110d may alternate brazes between each of the three manifolds 305-307, instead of completing all of the brazes on a first manifold before moving to the next, in order to maximize cooling time between brazes.

The brazing torches 110a-110d comprise four (4) individual torch heads in the illustrated embodiment. FIG. 4 shows two torches 110c and 110d performing a braze on the front side of the fixture frame 112. Two substantially similar torches 110a and 110b (FIG. 2) are operating in conjunction with the front torches 110c and 110d to braze the joint from the rear side of the fixture frame 112. Each torch head is clocked generally ninety degrees to its neighboring torch head, such that each joint undergoing braze is surrounded by four generally equidistant torches. Although the illustrated disclosure contemplates four torches 110a-110d, in other embodiments, more or fewer torches may be deployed.

As discussed above with respect to FIG. 3, the lower edge 309 of the flip gates 301, 302 and 303 acts as a heat sink during brazing operations. The lower edge 309 contacting the smaller tubes 308 helps dissipate heat from the smaller tubes 308 during brazing. The flip gates 301-303 further comprise an opening 401 between the lower edge 309 and a top edge 402 of each of the flip gates 301-303. The opening 401 reduces the material in the flip gates, which improves the ability of the lower edge 309 to act as a heat sink to the smaller tubes 308. In the illustrated embodiment, the opening 401 is generally rectangular and extends horizontally beyond the eight (8) smaller tubes 308. Further, in the illustrated embodiment, the lower edge 309 of the flip gate may be ⅜-⅝ inches wide, and ½ in deep (i.e., between the front edge of the flip gate and the tubes 308). In other embodiments, the opening 401 may be differently-dimensioned and configured.

The lifting platform 109 and sliding platform 121 together oscillate to move the brazing torches 110a-110d left and right and up and down with respect to the joint undergoing brazing. In this regard, the system allows for up to ten (10) "sub-positions" to be programmed per braze joint, e.g., slight movements up and down and right and left that allow the torches to "dance" around the joint to evenly melt the brazing alloy.

FIG. 5 is an enlarged partial view of the platform 115 of FIG. 1 showing a thermocouple probe 501 in its storage position. The thermocouple probe 501 is used by the operator (not shown) to measure the temperature of a manifold (not shown) before brazing begins. In this regard, before a brazing operation begins, the operator touches the thermocouple probe 501 to the manifold and actuates a button 502 on an operator panel 509 to measure the temperature of the manifold. The temperature is automatically sensed by the controller 106 (FIG. 1), which can adjust the timing of the brazing operation based upon the temperature of the manifold and the ambient temperature, In other words, the controller 106 can either shorten or lengthen the time of the braze based upon the temperature measurement. This correction is important because for aluminum tubes, the temperature at which the brazing alloy melts is not that different from the temperature at which the aluminum tubing itself would melt, e.g., a difference of 50-75 degrees, which is not a lot when compared with the brazing temperature of 1100 degrees F.

The operator panel 509 further comprises an emergency stop button 506, which is in the color red in the illustrated embodiment. The operator panel 509 further comprises two start buttons 507a and 507b. In order to start the system, the user must push both start buttons 507a and 507b at the same time. A manual pin 508 must be locked in place in the platform 115 before the brazing cycle will start. The platform 115 will not rotate without the manual pin 508 locked into place.

FIG. 6 is a partial view of the fixture frame 112 while the fixture frame 112 is at the loading station 104 (FIG. 1). The flip gate 303 is flipped up during loading of the manifold tubes (not shown). A plurality of semi-circular indentations 602 in the flip gate 303 aligns with indentations 605 in an associated fixture 604 to hold the smaller tubes 308 (FIG. 3). The flip gate 303 is hinged to allow it to flip upwardly for loading, and downwardly to secure the smaller tubes 308. A latch 606 secures the flip gate after the smaller tubes have been loaded.

What is claimed is:

1. A system for automatically brazing joints in a manifold, the system comprising:
   a first fixture frame, the first fixture frame configured to support one or more manifolds;
   a second fixture frame, the second fixture frame configured to support one or more manifolds;
   a third fixture frame, the third fixture frame configured to support one or more manifolds, the first, second and third fixture frames disposed on a common rotatable platform, each fixture frame comprising a structural frame with a top edge and a bottom edge radially extending outwardly from the common rotatable platform, a substantially-vertical inner edge extending between the top and bottom edges, and a substantially-vertical outer edge extending between the top and bottom edges, the top edge, bottom edge, substantially-vertical inner edge and substantially-vertical outer edge defining an opening, the opening configured to allow tubes to pass through the fixture frame;
   a brazing station comprising a plurality of brazing torches configured to automatically braze one or more manifold joints in one of the first, second, or third fixture frames upon command by a controller; and
   an insulated barn disposed at a radial end of a fixture frame of the common rotatable platform, the controller configured to park the brazing torches in the barn when the brazing torches are not in use, the controller further configured to cause the brazing torches to go into a low mode when they are parked in the barn.

2. The system of claim 1, the first, second and third fixture frames each radiating outwardly from the common rotatable platform, the common rotatable platform configured to rotate each fixture frame through the brazing station in turn.

3. The system of claim 2, further comprising a cooling station and a loading station.

4. The system of claim 1, the plurality of brazing torches comprising four (4) torches disposed substantially ninety-degrees apart to surround a joint on four sides.

5. The system of claim 1, the brazing torches disposed on a lifting platform, the lifting platform configured to move the brazing torches up and down in a substantially vertical direction.

6. The system of claim 5, the lifting platform disposed on a sliding platform, the sliding platform configured to move the lifting platform back and forth in a substantially horizontal direction.

7. The system of claim 6, the lifting platform and the sliding platform configured to oscillate to move the brazing torches slightly left and right and up and down with respect to the joint undergoing brazing.

* * * * *